(12) United States Patent
Isoyama et al.

(10) Patent No.: US 6,418,145 B1
(45) Date of Patent: Jul. 9, 2002

(54) INTERNET PROTOCOL LAYER PROCESSOR

(75) Inventors: Kazuhiko Isoyama; Tatsuhiko Amagai; Toshiya Aramaki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/213,931

(22) Filed: Dec. 17, 1998

(30) Foreign Application Priority Data

Dec. 17, 1997 (JP) .............................................. 9-347481

(51) Int. Cl.[7] .............................................. H04L 12/56
(52) U.S. Cl. ................... 370/395.65; 370/473; 370/474
(58) Field of Search ........................ 370/395.1, 395.51, 370/395.52, 395.6, 395.65, 397, 471, 473, 474, 47 C

(56) References Cited

U.S. PATENT DOCUMENTS

| 5,715,250 A | * | 2/1998 | Watanabe ..................... 370/395 |
| 5,917,828 A | * | 6/1999 | Thompson ................... 370/474 |
| 5,963,555 A | * | 10/1999 | Takase et al. ............... 370/395 |
| 6,137,798 A | * | 10/2000 | Nishihara et al. ........... 370/392 |
| 6,343,322 B2 | * | 1/2002 | Nagami et al. .............. 709/227 |

FOREIGN PATENT DOCUMENTS

| JP | 5-336099 | 12/1993 |
| JP | 6-164682 | 6/1994 |
| JP | 8-186584 | 7/1996 |
| JP | 8-205103 | 8/1996 |
| JP | 8-274815 | 10/1996 |
| JP | 9-98189 | 4/1997 |
| JP | 9-135261 | 5/1997 |

* cited by examiner

*Primary Examiner*—Chau Nguyen
*Assistant Examiner*—Duc Duong
(74) *Attorney, Agent, or Firm*—Foley & Lardner

(57) ABSTRACT

An internet protocol (IP) layer processor has an IP header processing section for checking a defect in an IP header of a first ATM cell of an AAL5 frame, and a SAR (segregation and reassemblage) section for transferring the AAL5 frame in the form of separate ATM cells if the check by the IP header processing section indicates a normal IP header, without using a CPU. SAR notifies a defect in the IP header to CPU without transmission of the AAL5 frame if the check indicates the defect in the IP header. The IP layer processor achieves a higher processing due to the direct transfer by the SAR without using processing by a software.

11 Claims, 9 Drawing Sheets

VC TABLE 41

| RECEIVED VPI/VCI | FRAME ASSEMBLY | IP PROCESSING | DESCRIPTOR |
|---|---|---|---|
| VCC#1 | NO | YES | — |
| VCC#2 | YES | NO | DESCRIPTOR#A |
|  |  |  |  |
|  |  |  |  |

| DESTINATION ADDRESS | DESTINATION VPI/VCI |
|---|---|
| ADD #A | VCC #1 |
| ADD #B | VCC #2 |
| | |

| DESTINATION ADDRESS | DESTINATION PORT | SOURCE ADDRESS | SOURCE PORT | DESTINATION VPI/VCI |
|---|---|---|---|---|
| ADD #A | PORT #A | ADD #Y | PORT #Y | VCC #11 |
| ADD #B | PORT #B | ADD #Z | PORT #Z | VCC #12 |
| | | | | |

FIG. 10

INTERNET PROTOCOL LAYER PROCESSOR

BACKGROUND OF THE INVENTION (a) Field of the Invention

The present invention relates to an internet protocol (IP) layer processor for use in SAR (Segmentation And Reassemblage) of an AAL5 frame in an ATM (asynchronous transfer mode) switching system.

(b) Description of the Related Art

In a IP packet transfer system in a conventional ATM switching system, ATM cells of an AAL5 frame are first received in a SAR section (referred to as simply SAR hereinafter) through the ATM interface by using a virtual channel connection (VCC). The destination of IP packets is determined by a higher-level system, such as a software which runs on a CPU, to collect the AAL5 frame for 1P header processing, after reassembling the ATM cells into an AAL5 frame. Thereafter, transmission is requested from the higher level system to the SAR by designating the VPI (virtual pass identifier)/VCI (virtual channel identifier) of the destinations.

FIG. 1 shows an example of conventional IP packet transfer system in an ATM switching system. A SAR 51 receives ATM cells of an AAL5 frame through an ATM interface 56, stores the received ATM cells in a SAR frame buffer 52 for each VCC which received the ATM cells, and at the same time, records the receipt information, such as received VPI/VCI, number of received cells and CRC calculation, in the descriptor of a SAR control memory 53. After the receipt from the first cell to the last cell of the AAL5 frame and reassemblage of these ATM cells into an AAL5 frame, SAR 51 delivers a receipt notification to CPU 55.

The AAL5 frame, as shown in FIG. 2, includes a CPCS-PDU payload, a PAD and a CPCS-PDU trailer, CPCS-PDU payload including a RFC1483 header and an IP datagram. RFC1483 header and IP datagram have a configuration such as shown in FIG. 3.

In FIG. 1, after CPU 55 receives the receipt notification, CPU 55 retrieves information of the AAL5 frame from the descriptor of SAR control memory 53, collects the AAL5 frame from frame buffer 52, and makes a copy of the same in a CPU local memory 54. The IP datagram is capsulated in the CPCS-PDU payload of the AAL5 frame of FIG. 2, and it is possible to judge whether or not the capsulation of the IP datagram is completed based on a LLC/OUI/PID headers of the RFC1483 header section added to the head of the IP datagram.

CPU55 (and thus, software) confirms whether or not the header is correct by checking the version, the header length and the check sum of the IP header in the IP datagram. In addition, the software decrements the value of a TTL (Time To Live) field in the header, and discards the IP datagram after the value of TTL field is reduced to zero or less. The IP datagram having a normal or correct IP header and a positive value of TTL field is transferred to the next hop (or next destination). For this purpose, a destination is retrieved in a routing table formed by a layer 3 routing protocol, based on the destination address in the IP header, thereby determining the destination of the IP datagram. The IP datagram having the destination thus determined is again subjected to checking of the header check sum, so as to rewrite the IP header. Thereafter, the IP datagram is added with a RFC header, capsulated into the AAL5 frame and transferred from SAR 51 to the specified destination after CPU 55 requests transmission from SAR 51 by designating VPI/VCI of the destination.

In the conventional IP layer processor, as described above, the software collects the AAL5 frame received by the SAR and operates for IP header processing, followed by transmission of the same using the SAR. This causes a large time length due to the transfer of the AAL5 frame between the SAR and the software as well as the low processing rate by the software, thereby reducing the throughput of the IP datagram transmission.

Patent Publication JP-A-9-98189 proposes an IP layer processor, wherein a controller equivalent to the SAR as described above has an additional function for processing the routing table and the IP header, whereby the IP header in the received AAL5 frame is processed and the destination is retrieved by the controller. This enables an automated transmission (or transfer) of the AAL5 frame without using processing by the software to thereby improve the throughput of the IP layer processor.

However, in the proposed IP layer processor, if the IP header has a defect, the automated transfer of the AAL5 frame cannot use a function for discarding the IP datagram or generating an error message to be returned to the source address.

In some VCCs, a protocol other than the IP protocol may be used and, in addition, a plurality of protocols may be also used in a single VCC according to the RFC1483 standard, wherein the protocols in a plurality of packets capsulated in the RFC1483 header are identified. Accordingly, even in the automated transfer as proposed in the above publication, the VPI/VCI or RFC 1483 header section does not operate for IP header processing, which necessitates transfer of the protocol other than the IP protocol to the software or discard of the AAL5 frame if the software is not provided for supporting such processing.

In addition, if a large destination retrieval table having a large number of entries is used, a large time length is required for the retrieval. Thus, in the automated transfer proposed in the publication, it may occur that a second cell or a succeeding cell of the AAL5 frame arrives or the reassemblage of the AAL5 frame is completed, before the destination retrieval based on the first cell of the AAL5 frame is completed. That is, the large destination retrieval table may cause a problem in that the timing is not assured between the completion of the destination retrieval and the completion of the frame reassemblage, which complicates the timing design of the IP layer processor.

Further, as in the case of IFMP (RFC1953), layer 3 flow-switching and security function are introduced in the IP layer processing, which sometimes results in assignment of a dedicated VPI/VCI to a specified flow (such as data flow between destination address and source address or a series of packets flowing on each higher-layer protocol), in addition to assignment of a default VPI/VCI to a specific IP destination address. This necessitates the use of a plurality of retrieval tables for different retrieval conditions.

SUMMARY OF THE INVENTION

In view of the above, it is an object of the present invention to provide an IP layer processor which is capable of reducing the load of CPU.

It is another object of the present invention to provide an IP layer processor which allows a plurality of layer 3 protocols to exist on a single ATM interface.

It is another object of the present invention to provide an IP layer processor which is adapted to IFMP (IP flow management protocol) in a RFC1953 standard or RSVP (reservation protocol) in a RFC2205 standard and capable of assigning a dedicated transfer VCC to a specific flow while processing IP routing.

The present invention provides an IP layer processor comprising a cell receiving section for receiving an AAL5 frame including a plurality of ATM cells through each virtual channel connection (VCC), a cell judgment section for judging whether or not an ATM cell received by the cell receiving section is a first cell of the AAL5 frame, an IP header extraction section for processing the ATM cells and extracting an IP header from the ATM cell identified as the first cell by the cell judgment section, an IP header processing section for processing the IP header extracted by the IP header extraction section to generate an IP header record, a frame buffer for storing the ATM cells of the AAL5 frame processed by the IP header extraction section and the IP header processing section, a transfer judgment section for judging whether or not the ALL5 frame is to be transferred to a destination address based on the IP header record, a frame buffer read section for reading the ATM cells stored in the frame buffer if it is judged by the transfer judgment section that the AAL5 frame is to be transferred, a cell transfer section for transferring the AAL5 frame read by the frame buffer read section to the destination address in the form of separate ATM cells, a receipt notification section for notifying cell receipt information to a higher level system if it is judged by the transfer judgment section that the AAL5 frame is not to be transferred.

In accordance with the IP layer processor of the present invention, the ALL5 frame constituting IP datagram received in the cell receiving section and having a normal header can be transferred to the destination address without using a higher level system, such as a software (i.e., CPU), which allows reduction of the load of CPU. In addition, the ALL5 frame having a defect in a header or a destination address can be collected to the higher level system or discarded in the IP layer processor based on a setting in the IP layer processor. Further, generation and transmission of an error message to the source address is also possible, thereby achieving a higher speed for processing by the IP layer processor.

A plurality of layer 3 protocols can also exist on a single ATM interface because a VCC which received the ATM cells or RFC1483 interface can determine whether or not IP header processing is to be performed. Further, if a plurality of different destination retrieval tables are used, a dedicated VCC can be assigned to a specified flow while performing IP header processing. This enables the IP layer processor of the present invention to be adapted to IFMP in a RFC1953 standard or RSVP in a RFC2205 standard.

The above and other objects, features and advantages of the present invention will be more apparent from the following description, referring to the accompanying drawings.

BRIEF DESCRIPTION OF THE DRAWINGS

FIG. 6 is a schematic diagram of the VC table used in the IP header processing section of FIG. 5;

FIG. 9 is a schematic diagram of an example of the destination retrieval table used in the IP header processing section of FIG. 8; and FIG. 10 is a schematic diagram of another example of the destination retrieval table used in the IP header processing section of FIG. 8.

PREFERRED EMBODIMENTS OF THE INVENTION

Figure 1:
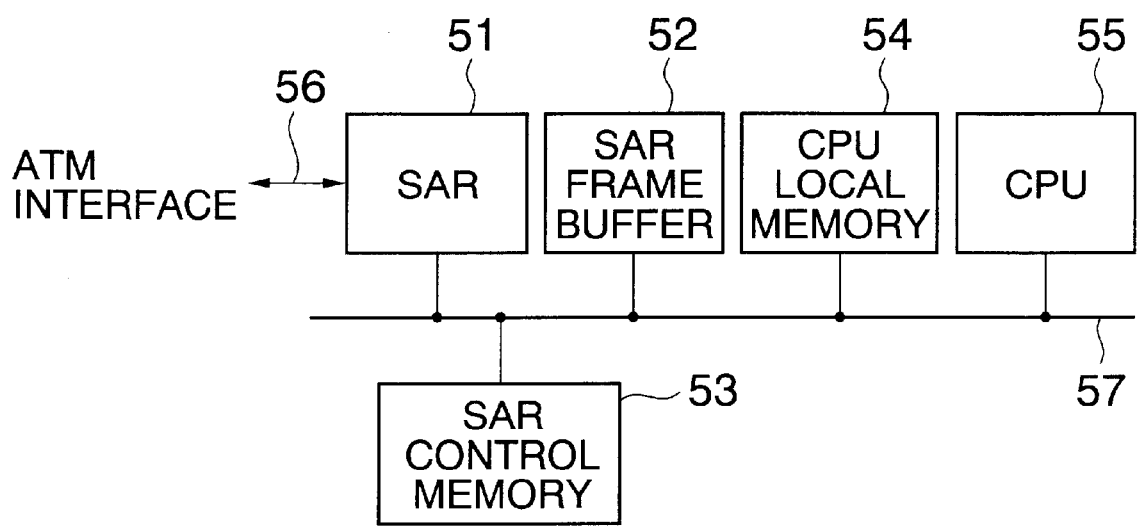
FIG. 1 is a block diagram of a conventional IP layer processor.
Figure 2:
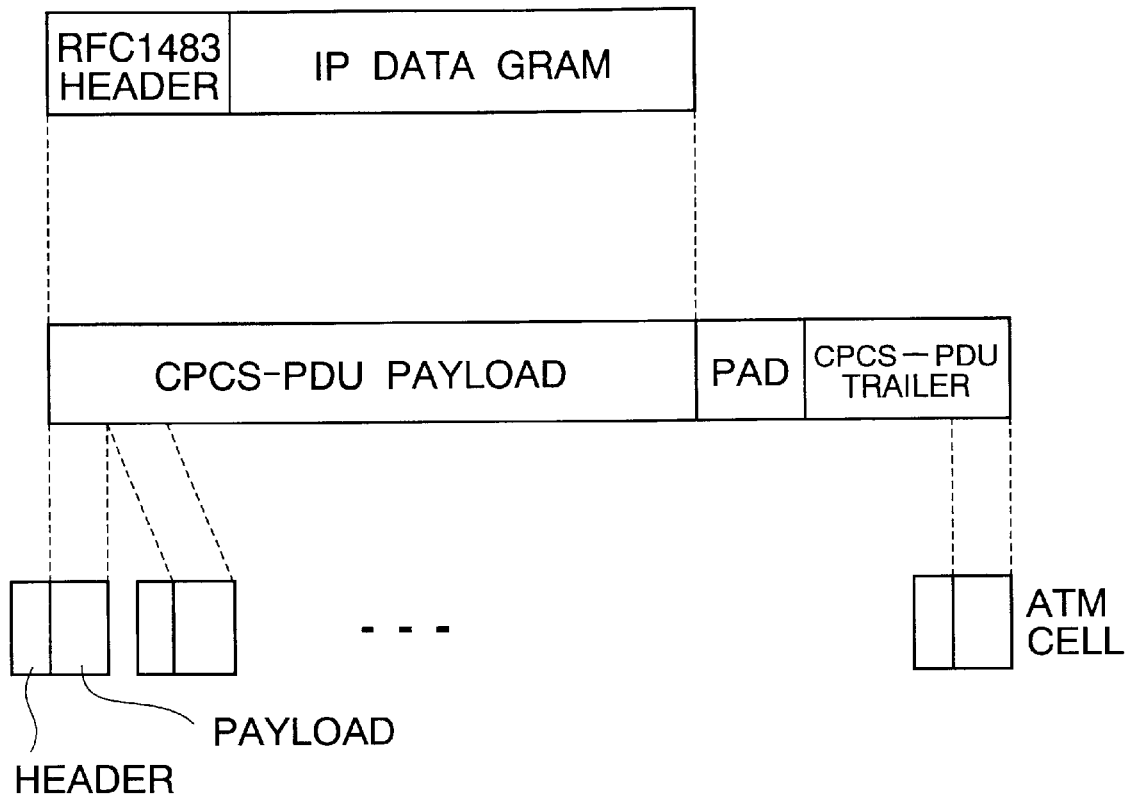
FIG. 2 is a schematic diagram of a typical AAL5 frame.
Figure 3:
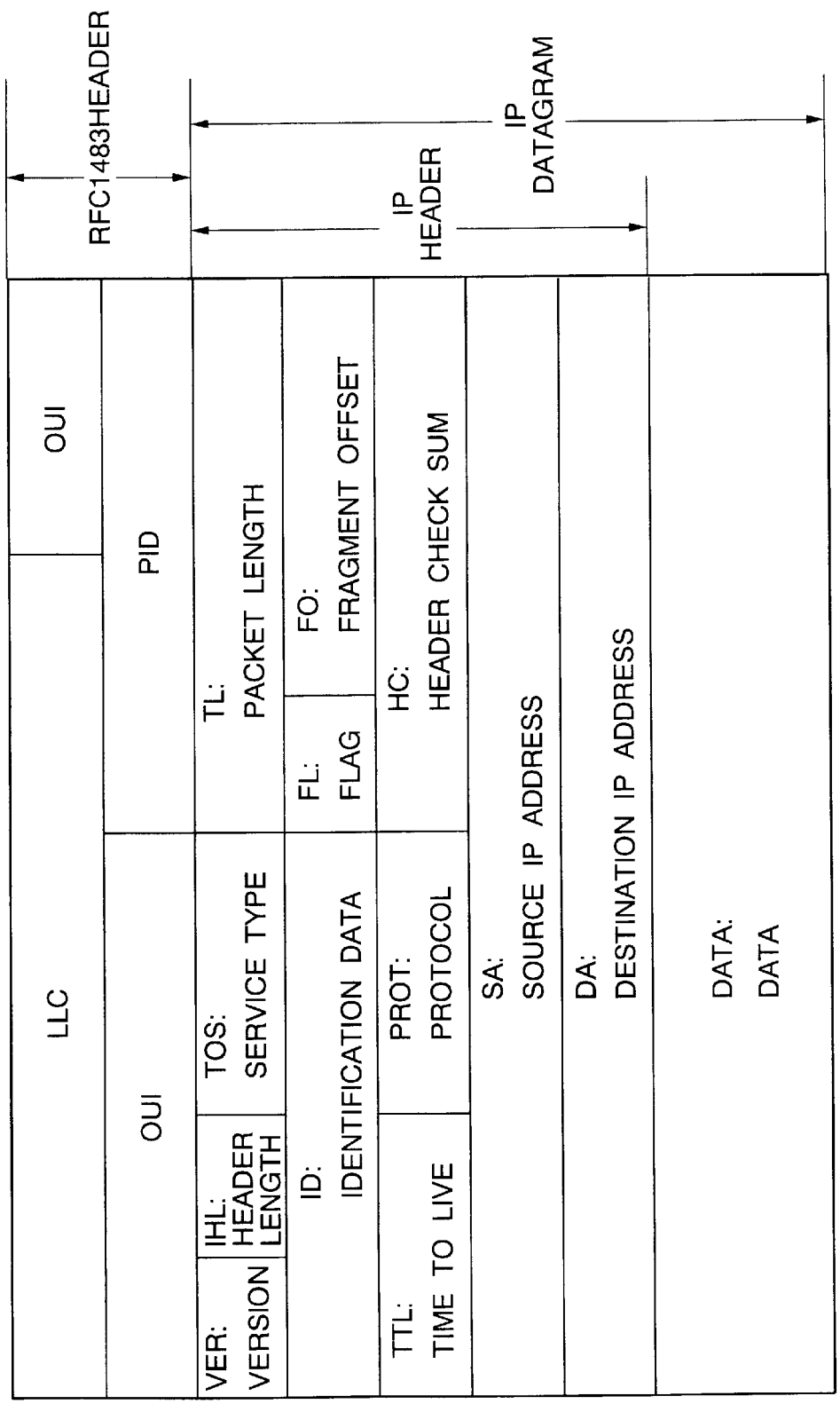
FIG. 3 is schematic diagram of a RFC1483 and an IP datagram.

Now, the present invention is more specifically described with reference to accompanying drawings, wherein similar constituent elements are designated by related reference numerals.

Figure 4:
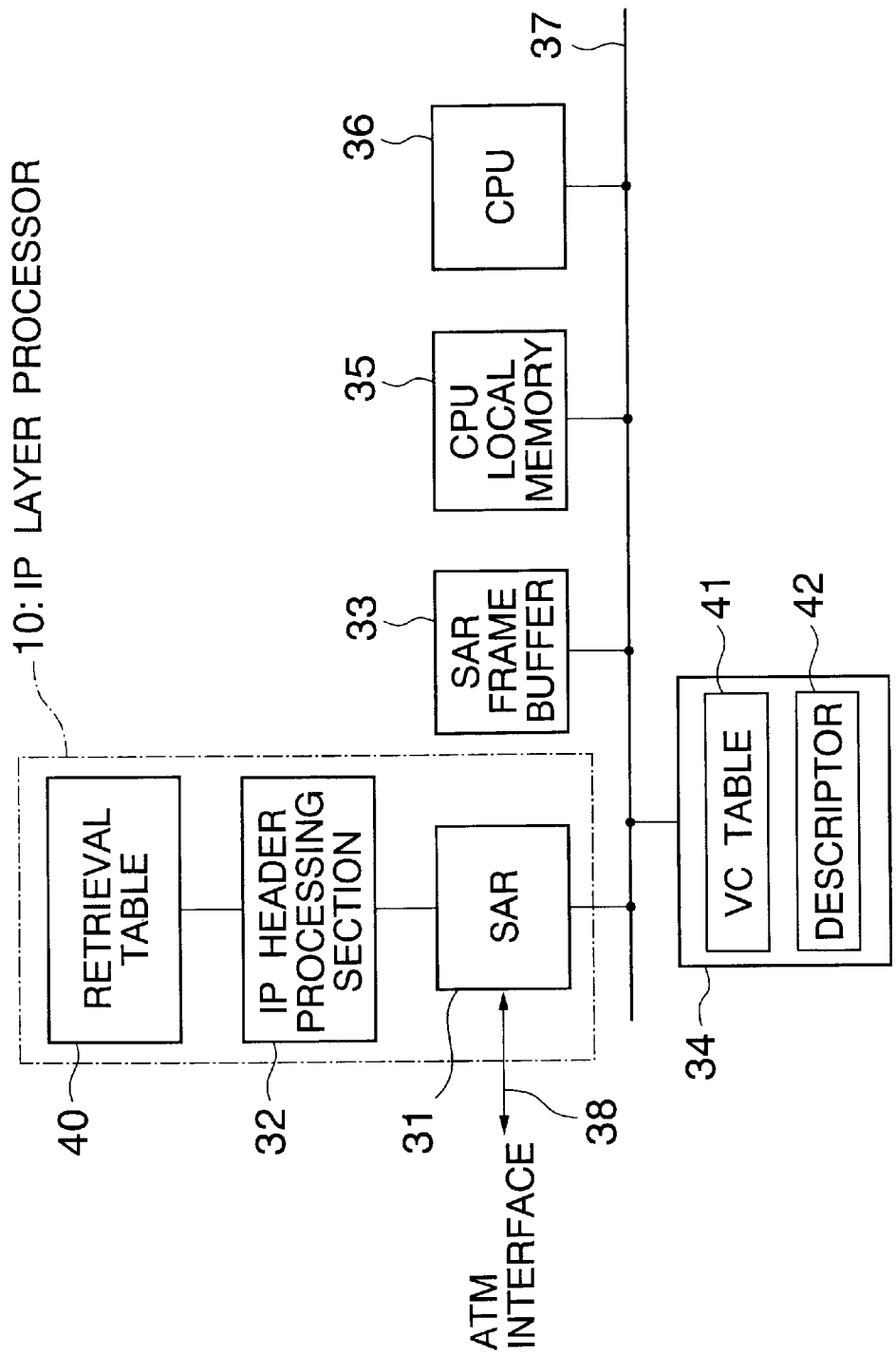
FIG. 4 is a block diagram of an example of an IP transfer system including an IP layer processor according to the present invention.

Referring to FIG. 4, an IP transfer system including an IP layer processor according to an embodiment of the present invention includes a SAR 31, an IP header processing section 32, a SAR frame buffer 33, a control memory 34 for storing a VC table 41 and a descriptor 42, a CPU local memory 35, and a CPU 36, which are directly coupled to one another by a bus line 37 except for IP header processing section 32. IP header processing section 32 is coupled to SAR 31 and to a destination retrieval table 40, SAR 31 receiving ATM cells through ATM interface 38. SAR 31, IP header processing section 32 and retrieval table 40 constitute the IP layer processor 10 according to the embodiment.

Figure 5:
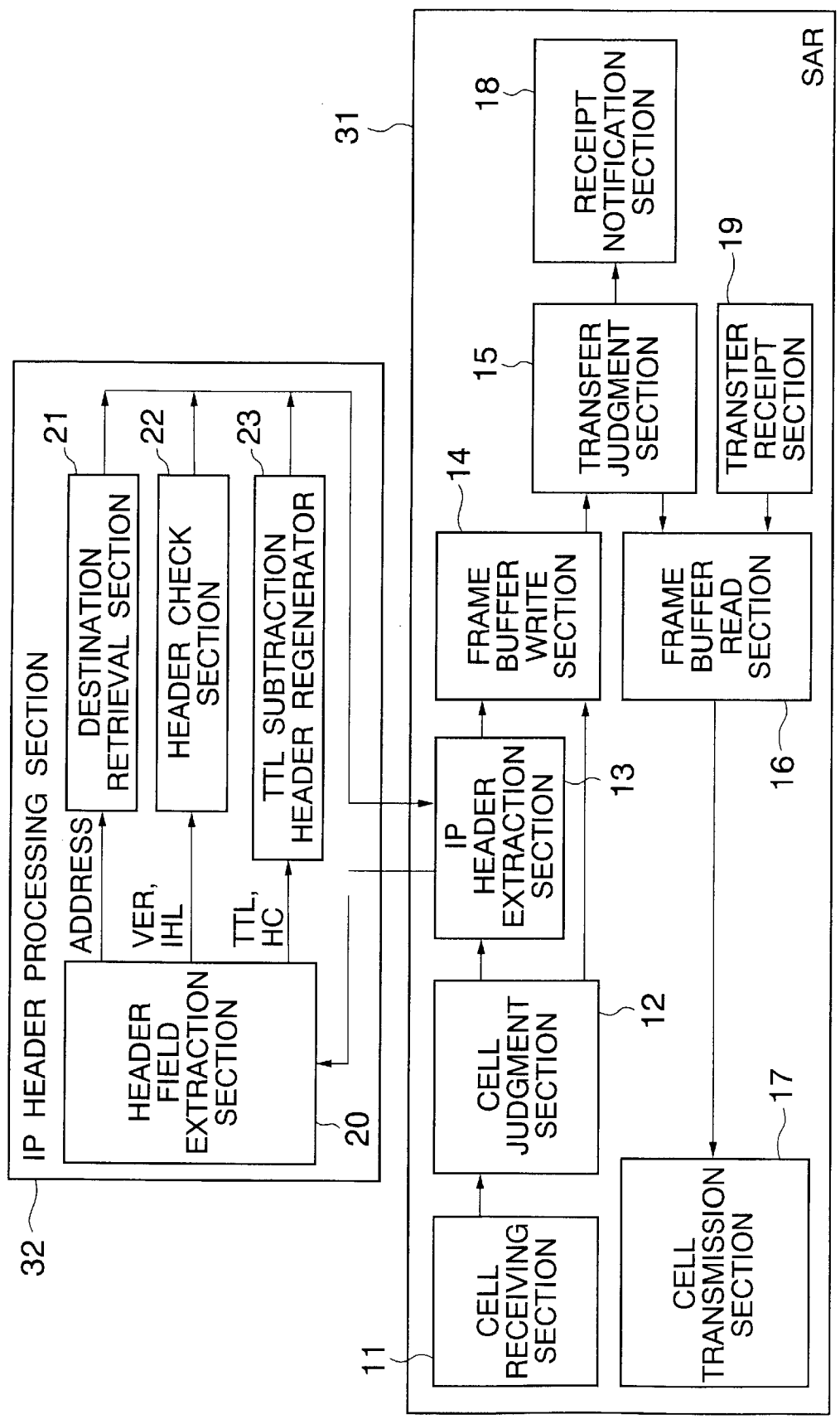
FIG. 5 is a block diagram of the IP header processing section and the associated SAR in a first embodiment of the IP layer processor shown in FIG. 4.

Referring to FIG. 5, there is show a first example of combination of IP header processing section 32 and SAR 31 in the IP layer processor 10 shown in FIG. 4. SAR 31 includes a cell receiving section 11, a first cell judgment section 12, an IP header extraction section 13, a frame buffer write section 14, a transfer judgment section 15, a frame buffer read section 16, a cell transmission section 17, a receipt notification section 18, and a transfer receipt section 19. IP header processing section 32 includes a header field extraction section 20, a destination retrieval section 21, a header check section 22, and a TTL subtraction header regenerator 23.

SAR 31 receives ATM cells through ATM interface 38 in cell receiving section 11 using a VCC for each ALL5 frame. Cell receiving section 11, after receiving an ATM cell, passes the same to first cell judgment section 12 as a received ATM cell. First cell judgment section 12 retrieves in a VC table 41 stored in control memory 34 upon receipt of the received ATM cell.

Referring to FIG. 6, VC table 41 includes, for each of VCCs VCC#1, VCC#2, ..., frame assembly information as to whether a frame is under assembly (YES) or not (NO), IP header processing information as to whether IP header processing is needed (YES) or not (NO), and assigned descriptor information as to which descriptor #A, #B ... is assigned or not assigned to the each of the VCCs. If it is judged based on the retrieval that the subject VCC having received ATM cell is not under a frame assembly, first cell judgment section 12 secures a new descriptor from the descriptor area 42 by determining that the received ATM cell is the first cell of a new AAL5 frame. Then, first cell judgment section 12 sets the secured descriptor after writing YES in the frame assembly information of the subject VCC. In addition, first cell judgment section 12 passes the ATM cell to header extraction section 13 if the content in the IP header processing information is YES for the subject VCC.

Header extraction section 13 extracts the RFC1483 header and the IP header from the payload of the ATM cell. If the RFC1483 header indicates the case of IP datagram, header extraction section 13 passes the IP header to header field extraction section 20 of IP header processing section 32.

In IP header processing section 32, each header field is extracted by header field extraction section 20. Based on the extracted header field, destination retrieval section 21, header check section 22 and TTL subtraction header regenerator 23 operate for destination retrieval based on the destination address etc., for normality check to verify the version, the header length and the header check sum etc., and for header regeneration subtraction to subtract TTL and recalculation of header check sum, respectively. The results of these operations are returned to header extraction section 13, followed by recording the results in the descriptor by header extraction section 13, passing the ATM cell payload to frame buffer write section 14 and write-in of the ATM cell payload by frame buffer write section 14 into the area of frame buffer 33 specified by the descriptor. The received cell information such as CRC calculation is also recorded in the descriptor.

On the other hand, a first cell for which it is described in the VC table 41 that IP header processing is not needed or in which the RFC1483 header does not indicate the case of IP datagram for the received ATM cell, IP processor does not operate for IP header processing for the first cell, and IP header extraction section 13 passes the first cell to frame buffer write section 14. The first cell is then stored in the area of frame buffer 33 specified by the descriptor.

If the ATM cell received by cell receiving section 11 is a second cell or a succeeding cell of an AAL5 frame, the frame assembly information for the subject VCC shows YES in VC table 41. Thus, first cell judgement section 12 passes the received cell as it is to frame buffer write section 14, which stores the received cell in the area of frame buffer 33 specified by the descriptor indicated in VC table 41. The received cell information of AAL5 frame such as CRC calculation is recorded in the descriptor.

After cell receiving section 11 receives the last cell of the AAL5 frame, frame buffer write section 14 stores the last cell in the frame buffer 33 and then notifies completion of assembly to transfer judgment section 15.

Transfer judgment section 15 examines the cell receipt records recorded in the descriptor 42, such as the results of IP header processing and CRC calculation. Transfer judgment section 15 rewrites the header based on the records, thereby requesting frame buffer read section 16 to transmit the AAL5 frame, if the AAL5 frame is normally received, with the IP header being normal or correct, with the value of TTL field being positive, and if a destination VPI/VCI is retrieved. Frame buffer read section 16, based on the request, passes the AAL5 frame to read cell transmission section 17, which transmits the AAL5 frame in the form of separate ATM cells to the destination VPI/VCI. The separate ATM cells are reassembled in the destination as a reassembled ALL5 frame.

On the other hand, either (1) if the AAL5 frame is not normally received, (2) if the IP header has an error, (3) if the value of TTL field is equal to or below zero, (4) if the destination cannot be retrieved in the retrieval table, or (5) if IP header processing is not completed, the AAL5 frame is collected by the software due to notification to the software from receipt notification section 18 or discarded in the SAR31. The judgment as to whether the AAL5 frame is to be passed to the software or discarded in the SAR31 can be separately determined in each of the cases (1) to (5).

The software having received the AAL5 frame operates for processing to generate and deliver an error message such as a packet transfer prohibition or a TTL time-out.

Figure 7:
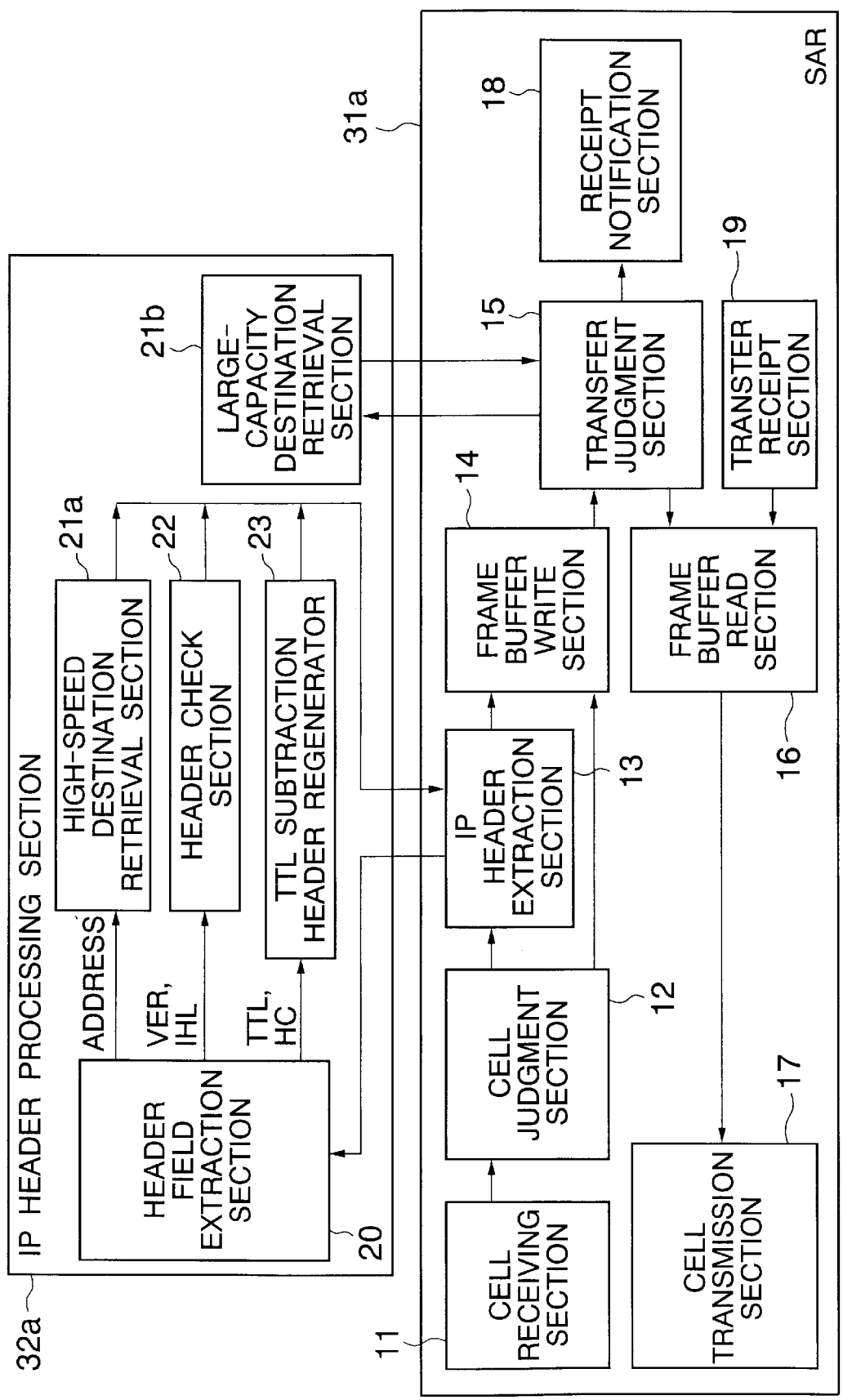
FIG. 7 is a block diagram of the IP header processing section and the associated SAR in a second embodiment of the IP layer processor shown in FIG. 4.

Referring to FIG. 7, an IP layer processor according to a second embodiment of the present invention is similar to the first embodiment except for the configuration of the IP header processing section 32a including a high-speed destination retrieval section 21a and an additional large-capacity destination retrieval section 21b and for the configuration of SAR 31a. High-speed destination retrieval section 21a is implemented as by CAM, and is capable of retrieving a destination in a small-size retrieval table having a small number of entries within a time period for receiving a single ATM cell. On the other hand, large-capacity destination retrieval section 21b is implemented as by binary-tree retrieval means, retrieves the destination in a large-size retrieval table including a large number of entries, however, at a lower speed, thereby being unable to assure a specific time limit for the retrieval.

When cell receiving section 11 receives the first cell of an AAL5 frame, the IP header processing section 32a operates, similarly to the process described with reference to FIG. 5, using high-speed destination retrieval section 21a. After the last cell of the AAL5 frame is received, this fact is notified to transfer judgment section 15, which uses high-speed destination retrieval section 21a based on the destination retrieval result recorded in the descriptor. If the retrieval by high-speed destination retrieval section 21a is failed, transfer judgment section 15 then uses large-capacity destination retrieval section 21b for an additional retrieval. At this time instant, since reassemblage of the AAL5 frame is already completed, it is not necessary to consider the timing between the completion of the retrieval and the interval of the receipt or completion of the frame reassemblage. This simplifies the configuration of the IP layer processor.

Figure 8:
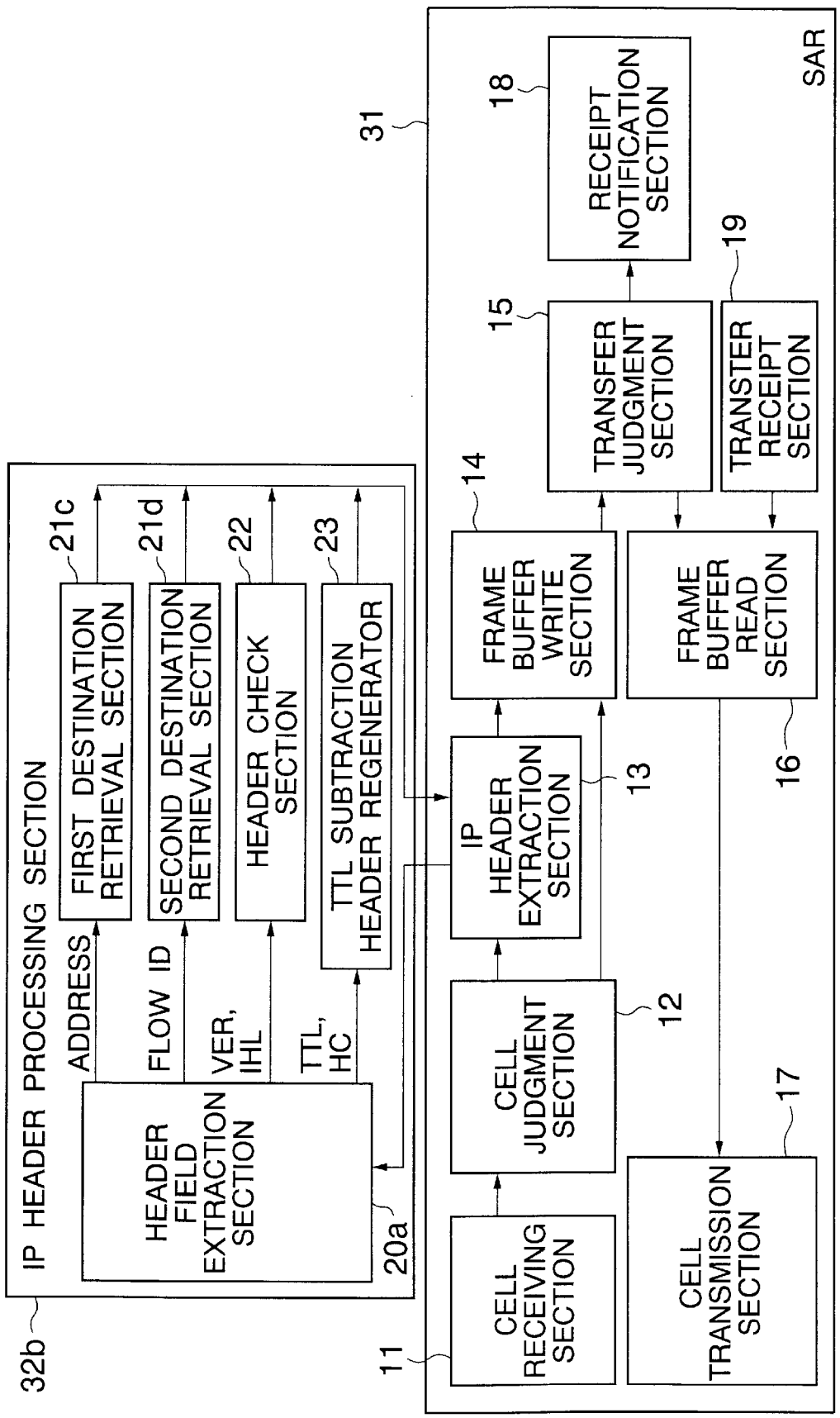
FIG. 8 is a block diagram of the IP header processing section and the associated SAR in a third embodiment of the IP layer processor shown in FIG. 4.

Referring to FIG. 8, an IP layer processor according to a third embodiment of the present invention is similar to the first embodiment, except for the configuration of IP header processing section 32b, which includes a first destination retrieval section 21c for retrieving based on destination address and a second destination retrieval section 21d for retrieving based on data flow.

Referring to FIG. 9, there is shown a retrieval table 40A used by first destination retrieval section 21c, wherein destination addresses ADD#A, ADD#B, . . . are tabulated in combination with destination VCCs VCC#1, VCC#2, . . . . The retrieval VC table 40A is prepared by layer 3 routing protocol. Referring to FIG. 10, there is shown another retrieval table 40B used by second destination retrieval section 21d for flow-based retrieval, wherein the destination addresses ADD#A, ADD#B, . . . are tabulated with destination ports PORT#A, POPRT#B, . . . , source addresses ADD#Y, ADD#Z, . . . , source ports PORT#Y, PORT#Z, . . . and destination VCCs VCC#11, VCC#12, . . . .

When cell receiving section 11 receives the first cell of an ALL5 frame, IP header is delivered to IP header processing section 31b, similarly to the first embodiment and also together with the destination port number and the source port number of the layer 4 header. After receiving the IP header and the layer 4 header, header field extraction section 20a extracts each header field therefrom and delivers the header field to the destination retrieval sections 21c and 21d. First and second destination retrieval sections 21c and 21d operate for retrieval independently of each other, wherein if both the retrieval sections 21c and 21d successfully retrieve the destination address, the destination VCC retrieved by second destination retrieval section 21d is used as the destination.

Since the above embodiments are described only for examples, the present invention is not limited to the above embodiments and various modifications or alterations can be easily made therefrom by those skilled in the art without departing from the scope of the present invention.

What is claimed is:

1. An internet protocol (IP) layer processor comprising a cell receiving section for receiving an AAL5 frame including a plurality of ATM cells through each virtual channel connection (VCC), a cell judgment section for judging whether or not an ATM cell received by said cell receiving section is a first cell of the AAL5 frame, an IP header extraction section for processing the ATM cells and extracting an IP header from the ATM cell identified as said first cell by said cell judgment section, an IP header processing section for processing the IP header extracted by said IP header extraction section to generate an IP header record, a frame buffer write section for storing in a frame buffer the ATM cells of the AAL5 frame processed by said IP header extraction section and said IP header processing section, a transfer judgment section for judging whether or not the ALL5 frame is to be transferred to a destination address based on the IP header record, a frame buffer read section for reading the ATM cells stored in the frame buffer if it is judged by said transfer judgment section that the AAL5 frame is to be transferred, a cell transfer section for transferring the AAL5 frame read by said frame buffer read section to the destination address in the form of separate ATM cells, a receipt notification section for notifying cell receipt information to a higher level system if it is judged by said transfer judgment section that the AAL5 frame is not to be transferred.

2. The IP layer processor as defined in claim 1, wherein said higher level system collects the AAL5 frame for which a cell receipt information is notified, and operates for capsulated IP packet processing for the collected AAL5 frame.

3. The IP layer processor as defined in claim 2, further comprising a VC table for tabulating an indication whether or not IP header processing is to be performed for each VCC, wherein said frame buffer write section stores the ATM cell identified as a first cell without processing by said IP header processing section and without extracting an IP header by said head extraction section if the VC table indicates omission of IP header processing for the first cell, wherein said receipt notification section notifies receipt of the AAL5 frame to said higher level system, and wherein said IP header extraction section extracts the IP header and said IP header processing section performs IP header processing if the VC table indicates that the VCC having received the first cell perform IP header processing for the first cell.

4. The IP layer processor as defined in claim 2, wherein said head extraction section extracts the IP header and LLC/OUI/PID headers capsulating the IP header in the AAL5 frame from the first cell, wherein, if the LLC/OUI/PID headers do not indicate capsulation of the AAL5 frame, said IP header processing section does not perform IP header processing, said frame buffer write section stores ATM cells, said receipt notification section notifies said higher level system after said cell receiving section receives the ATM cells of the AAL5 frame, and wherein said IP header processing section operates for IP header processing if the LLC/OUI/PID headers indicate capsulation of the AAL5 frame.

5. The IP layer processor as defined in claim 2, wherein, if said IP header processing section finds a defect in the IP header of the AAL5 frame, said transfer judgment section judges that the AAL5 frame is not to be transferred.

6. The IP layer processor as defined in claim 2, wherein said IP header processing section decrements a value of TTL field of the IP header in the AAL5 frame, and wherein said transfer judgement section judges that the AAL5 frame is not to be transferred if the value of TTL field is equal to or less then zero.

7. The IP layer processor as defined in claim 2, wherein the AAL5 frame is discarded if said transfer judgment section judges that the AAL5 frame is not to be transferred.

8. The IP layer processor as defined in claim 2, wherein said IP header processing section uses a plurality of destination retrieval tables for retrieving the destination address based on the IP header.

9. The IP layer processor as defined in claim 8, wherein said plurality of destination retrieval tables include a high-speed retrieval table for retrieving a destination within a time interval of a single cell time, and a large-capacity retrieval table having a larger number of entries than said high-speed retrieval table.

10. The IP layer processor as defined in claim 8, wherein said plurality of destination retrieval tables are based on different retrieving conditions, and wherein a retrieval result from one of said retrieval tables based on a more detailed retrieving condition is used if a plurality of retrieval tables having different retrieving conditions provide respective retrieval results.

11. The IP layer processor as defined in claim 10, wherein the different retrieving conditions include destination addresses, and combinations of a destination address, a source address and a port number of transport layer.

* * * * *